US012058635B2

(12) United States Patent
Pelletier et al.

(10) Patent No.: US 12,058,635 B2
(45) Date of Patent: Aug. 6, 2024

(54) WIRELESS RANGING AND TIME SYNCHRONIZATION

(71) Applicant: Woods Hole Oceanographic Institution, Woods Hole, MA (US)

(72) Inventors: Leo-Paul Pelletier, Brest (FR); Norman Farr, Woods Hole, MA (US); Jonathan Ware, Mashpee, MA (US); Christopher McRaven, East Falmouth, MA (US)

(73) Assignee: WOODS HOLE OCEANOGRAPHIC INSTITUTION, Woods Hole, MA (US)

( * ) Notice: Subject to any disclaimer, the term of this patent is extended or adjusted under 35 U.S.C. 154(b) by 283 days.

(21) Appl. No.: 17/509,860

(22) Filed: Oct. 25, 2021

(65) Prior Publication Data

US 2022/0132450 A1    Apr. 28, 2022

Related U.S. Application Data

(60) Provisional application No. 63/105,394, filed on Oct. 26, 2020.

(51) Int. Cl.
*H04W 56/00*        (2009.01)
*G01S 11/02*        (2010.01)
(Continued)

(52) U.S. Cl.
CPC ........ *H04W 56/0015* (2013.01); *G01S 11/02* (2013.01); *H04W 4/023* (2013.01); *H04W 4/44* (2018.02); *H04W 56/006* (2013.01)

(58) Field of Classification Search
CPC ........ G01S 11/02; G01S 17/74; H04W 4/023; H04W 4/44; H04W 56/0015; H04W 56/006
(Continued)

(56) References Cited

U.S. PATENT DOCUMENTS 7,953,326 B2   5/2011   Farr et al.
9,231,708 B2   1/2016   Farr et al.
(Continued)

OTHER PUBLICATIONS

McRaven et al., Wireless Retrieval of High-Rate Ocean Bottom Seismograph Data and Time Synchronization Using the WHOI Optical Modem and REMUS AUV, Presented Jun. 17-20, 2019, pp. 1-4, ieeexplore.ieee.org/document/8867409.
(Continued)

*Primary Examiner* — Robert J Lopata
(74) *Attorney, Agent, or Firm* — Douglas Denninger; Cristy Salanga

(57) ABSTRACT

A system and method enabling precise range estimation and time synchronization between a first object such as a vehicle having a primary communications mechanism and an interconnected first controller, and a second object having a secondary communications mechanism and an interconnected second controller. The primary sends communications into the environment and the secondary receives them; the secondary then sends replies to the primary. The communications have information for determining range between the two objects and for comparing the second object's internal clock with a more accurate clock of the first object. Repeated exchanges of communications between the two objects enables additional precision of range as well as time synchronization information.

20 Claims, 6 Drawing Sheets

(51) Int. Cl.
*H04W 4/02* (2018.01)
*H04W 4/44* (2018.01)

(58) Field of Classification Search
USPC .......................................................... 370/329
See application file for complete search history.

(56) References Cited

U.S. PATENT DOCUMENTS

| | | | | |
|---|---|---|---|---|
| 9,628,952 | B2* | 4/2017 | Schell | H04W 4/023 |
| 10,986,600 | B1* | 4/2021 | Chu | G01S 5/021 |
| 2015/0055609 | A1* | 2/2015 | Rausch | H04H 60/91 |
| | | | | 370/329 |
| 2018/0205699 | A1* | 7/2018 | Weinfield | H04W 4/023 |
| 2020/0309897 | A1* | 10/2020 | Ray | G01S 13/876 |
| 2020/0309933 | A1* | 10/2020 | Ray | G01S 13/282 |

OTHER PUBLICATIONS

McRaven et al., Wireless Retrieval of High-Rate Ocean Bottom Seismograph Data and Time Synchronization Using the WHOI Optical Modem and Remus Auv, Presented at Oceans Conference Oct. 27-31, 2019, Slides 1-14.

Pelletier et al., Delivery of Accurate Timing to Subsea Instruments via Optical Modem Technology with the Added Benefit of Optical Range Measurement, Oceans Conference Oct. 27-31, 2019, pp. 1-4, ieeeexplore.ieee.org/document/8962653.

* cited by examiner

WIRELESS RANGING AND TIME SYNCHRONIZATION

CROSS-REFERENCE TO RELATED APPLICATION

This application claims benefit to U.S. Provisional Patent Application No. 63/105,394 filed on 26 Oct. 2020, the disclosure of which is hereby incorporated by reference in its entirety.

STATEMENT OF RIGHTS TO INVENTIONS MADE UNDER FEDERAL FUNDING

This invention was made with Government support under OCE-1532035 awarded by the National Science Foundation. The Government has certain rights in this invention.

FIELD OF THE INVENTION

This invention relates to wireless communication systems. More specifically, this invention relates to communication systems denied geo-location information, most often in submerged environments.

BACKGROUND OF THE INVENTION

Equipment and sensors submerged under liquids (e.g., underwater) present a challenge for information retrieval and timekeeping. A common technique of information and timekeeping relies on satellites, either for communications (e.g., Iridium Communications) or for updating internal clocks (e.g., GPS clock signal). However, submerged systems containing sensors and other equipment cannot connect to satellite systems until sufficiently close to the surface of the liquid. This presents a problem when data cannot be retrieved from the submerged system or when internal clock drift cannot be determined, documented, or corrected.

One critically important area is sustained earthquake monitoring, which most often relies on submerged systems called ocean bottom seismometers (OBS). OBS are deployed to offshore areas of high seismic risk such as the continental shelf and slope above the Cascadia, Alaska/Aleutians, and Puerto Rico subduction zones, for example. OBS deployment improves the understanding of the internal structure and rupture properties of these faults, and potentially allow advanced warning of increased short-term seismic risk. Studies of these areas have demonstrated that there are time periods on the scale of days to weeks when large subduction earthquakes are more likely to occur. To fully understand this basic fault behavior and possibly utilize it to reduce risk to society, we need access to high quality data from offshore directly above where the great earthquakes rupture.

Retrieving high quality seismic and geodetic data from the seafloor pushes the limits of currently affordable telemetry systems. Fiber-optic cabled, real-time seismic stations, such as those deployed offshore Japan, the West coast of Canada and the NW coast of the US, are superb platforms for earthquake monitoring but are expensive to deploy.

A number of recent technological advancements, including a factor of >10,000 increase in underwater telemetry speeds, extended range autonomous underwater vehicles (AUVs), and improved autonomous rendezvous behavior, enhance the need for long-term deployments with reliable routine data access.

SUMMARY OF THE INVENTION

This invention features a system for wireless time comparison and ranging between a vehicle and an object, the vehicle having an interconnected primary communications device and a first controller. The primary communications device is configured to transmit and receive communications, and the first controller is configured to receive information from the primary communications device. The first controller instructs the primary communications device to transmit a first communication including (i) primary periodic timing information and (ii) time-of-day information. The object includes an interconnected secondary communications device and second controller. The secondary communications device is configured to receive the first communication, the second controller is configured to receive the information in the first communication from the secondary communications device, and the second controller is configured to instruct the secondary communications device to transmit a second communication including secondary periodic timing information. The primary communications device is configured to receive the second communication and the first controller is configured to construct a Timing Transfer Frame having data based on the first and second communication. The Timing Transfer Frame includes data relating to time-of-flight of communications between the vehicle and the object, and the first controller determines a range between the vehicle and the object using the data in the Timing Transfer Frame.

In a number of embodiments, the primary periodic timing information includes a primary Pulse-Per-Second signal and the secondary timing information includes a secondary Pulse-Per-Second signal. In some embodiments, the vehicle further includes a first clock connected to the first controller, the object further includes a second clock connected to the second controller, and the first communication includes time-of-day information from the first clock. The second controller calculates a corrected time using the first communication, and the second clock is reset with the corrected time. In certain embodiments, the second communication includes time information from the second clock. In some embodiments, the first controller calculates a corrected time using the second communication, and the first controller instructs the primary communications device to transmit a third communication containing the corrected time. The secondary communications device is configured to receive the third communication, the second controller is configured to receive the information in the third communication from the secondary, and the second controller calculates a second corrected time using the third communication, and wherein the second clock is reset with the second corrected time. In certain embodiments, the first controller (i) stores the range in a storage medium and/or (ii) transmits the range to a remote location.

This invention also features a non-transient computer readable medium containing program instruction for causing a computer to perform a method including:
(a) instructing a primary communications device to transmit a first communication including (i) primary periodic timing information and (ii) time-of-day information from a first clock;
(b) receiving, from the primary communications device, a received second communication containing information, the second communication originating from a secondary communications device; and
(c) constructing a Timing Transfer Frame from the first and second communication, wherein the Timing Transfer Frame includes range information relating to the time of flight of the Timing Transfer Frame between the primary communications device and the secondary communications device.

In some embodiments, steps include determining a range between the primary communications device and the secondary communications device. In certain embodiments, the received second communication includes time information from a second clock interconnected with the secondary. The performed method may include calculating a corrected time using the second communication, and instructing the primary to transmit a third communication including the corrected time. Additional steps may include receiving, from the primary, a received fourth communication, the second communication originating from the secondary, and constructing a second Timing Transfer Frame from the third and fourth communications, wherein the second Timing Transfer Frame includes second range information relating to the time of flight of the Timing Transfer Frame between the primary communications device and the secondary communications device.

In certain embodiments, the performed method includes calculating a corrected time using the first communication, and including the corrected time in the second communication. In some embodiments, the performed method includes instructing the secondary communications device to transmit a fourth communication including the corrected time. In one embodiment, the performed method includes resetting the second clock with the corrected time, and sending additional communications and constructing additional Timing Transfer Frames. A precise range is determined between the primary and secondary using the additional Timing Transfer Frames, and a precise corrected time is determined using the additional Timing Transfer Frames

BRIEF DESCRIPTION OF THE DRAWINGS

In what follows, preferred embodiments of the invention are explained in more detail with reference to the drawings, in which.

DETAILED DESCRIPTION OF THE PRESENTLY PREFERRED EMBODIMENTS

Technology Overview

Figure 1A:
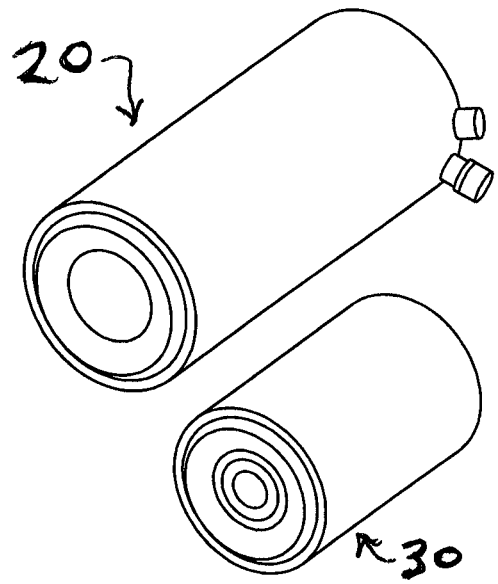
FIG. 1A is a schematic perspective view of a primary communications device according to one embodiment of the present invention, including a 1000 meter-depth rated optical modem, depicting two halves of the communications device, with a receiver portion on the left, and an emitter to the right of the receiver.

This disclosure focuses on a new capability for both providing an update of accurate time to systems deployed underwater, and the ability to also measure range between vehicles moving through an underwater environment relative to each other or to submerged objects such as ocean bottom seismometers (OBS). This new concept is to transfer timing information, having (i) a timestamp representing time-of-day and (ii) a Pulse-per-Second (PPS) edge, within a Time Domain Multi-Access (TDMA) structure. The term "time-of-day" is utilized in a broad sense to include daily times based on (a) atomic time such as TAI (International Atomic Time) or UTC (Coordinated Universal Time) or (b) the rotation of a planet such as Earth's daily rotation utilized for UT (Universal Time).

Although transmitting a timestamp is known, most conventional systems have loose timing requirements. However, the delivery of an accurate PPS edge (<1 microsec accuracy) cannot be sent as part of the data payload over the link using existing solutions such as Network Time Protocol (NTP) or Precision Time Protocol (PTP). This is because of the variable latency induced by current optical communication systems. This invention provides a custom, low-level solution which is integrated with the data transfer function, and minimally interferes with optical data transfer capability.

The deployment duration of submerged systems often is limited by non-optimum timing brought about by large and non-linear clock drifts that increase with deployment duration. As one need discussed in the Background section above, sustained earthquake monitoring typically relies on submerged systems such as OBS. Precise and accurate timing is a requirement not only for measuring earthquake locations and spatio-temporal migration rates, but also for measuring temporal changes in rock velocity indicative of stress changes that can be indicators of near-term rupture. Disclosed herein is a novel development of the capability for complete data retrieval from autonomous submerged sensors using highspeed optical telemetry modem capable of sustained transfer rates of 10 Mbits/second from a variety of platforms, including fully autonomous underwater vehicles. In addition to retrieving data, the offset of the submerged sensor's clocks relative to GPS-referenced time can be accurately measured and logged via the optical link, and then adjusted as desired.

This disclosure expands the concept of optical communications (i.e., an optical modem or two communicating optical modems) as an appliance concept by letting the user feed a Pulse-per-Second (PPS) signal into a first, or Primary, recoverable optical modem of a primary communications device (e.g., on a primary vehicle) and then into a second, or Secondary, optical modem; signals are delivered to the remote equipment attached to the secondary modem with minimal additional jitter (40 ns RMS). The trade-off between jitter and remote timing lock is field-configurable.

A Network Time Protocol (NTP) server is used to capture and transfer the vehicle time-of-day. Using this new advancement in optical communications technology, the remote equipment's clock compares its own clock drift to the freshly disciplined vehicle clock without perturbing the data offload capacity, at a slight cost of available bandwidth.

Figure 2:
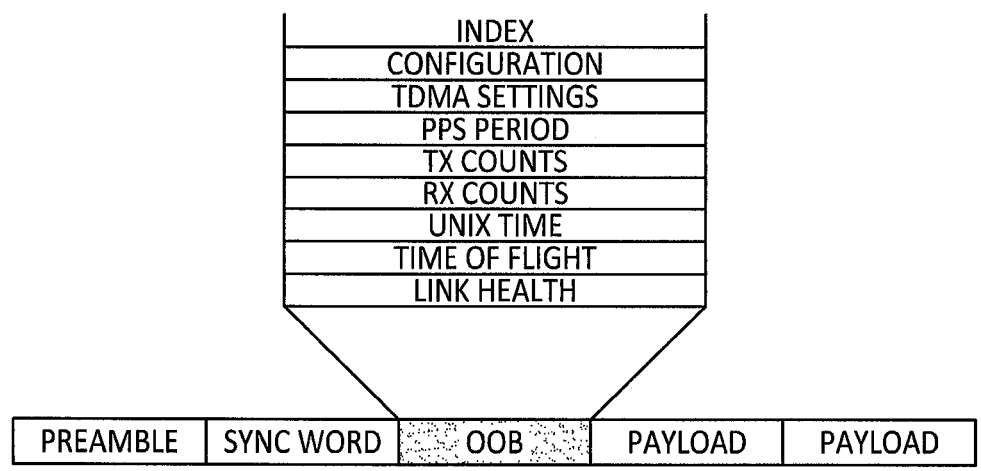
FIG. 2 illustrates a new "Out-of-Band" (OOB) frame protocol according to the present invention, also referred to herein as a "Timing Transfer Frame" or "Timing and Configuration Frame", and its position within the Time Domain Multi-Access (TDMA) burst, according to one embodiment.

To achieve this, the Optical Modem Physical Layer (PHY) has been modified according to the present invention to interleave measurement and configuration data frames, referred to as Out-of-Band (OOB) frames, "Timing Transfer Frames" or "Timing and Configuration Frames", alongside the legacy payload frames such as illustrated in FIG. 2. These new frames provide a direct deterministic, bottom-level communication channel for optical modems to exchange link information. The PPS recovery mechanism estimates the transmission (time-of-flight) and modem processing delay by measuring the time, in Field Programmable Gate Array (FPGA) clock cycles, between a determined point in the frame transmission process and the correlation peak of the frame detector on both sides of the optical link, exchanges that information over the Out-of-Band channel and feeds it to a local tracking loop. This local loop, independent from the reference optical modem, can accommodate a fairly big frequency error between primary and secondary FPGA clocks. Because the only variable delay is the time light takes to travel between the two optical modems, an additional benefit of the work done to make the timing transfer possible, is the ability to optically measure range between optical modems. While the raw resolution may be poor expressed in FPGA clock increments, the measurement distribution is observed to be Gaussian, and the sampling frequency is 100 Hz, thus the estimated range can be easily improved with averaging.

Stated in another manner, novel time markers including a PPS signal and a timecode are embedded in a wireless transmission such as an optical modem data stream between a primary object and a secondary object, and a processor within each object records when that object receives the time markers. The time-of-flight (environmental delay) is the same in both directions during TDMA transmissions, so correcting for all processing delays other than environmental delays reveals the time-of-flight during reconstruction of the PPS signal and thereby estimates range between the primary object and the secondary object. In some constructions, the secondary clock is synchronized with the primary clock to correct for timing drift in the secondary clock.

System Overview

Figure 7:
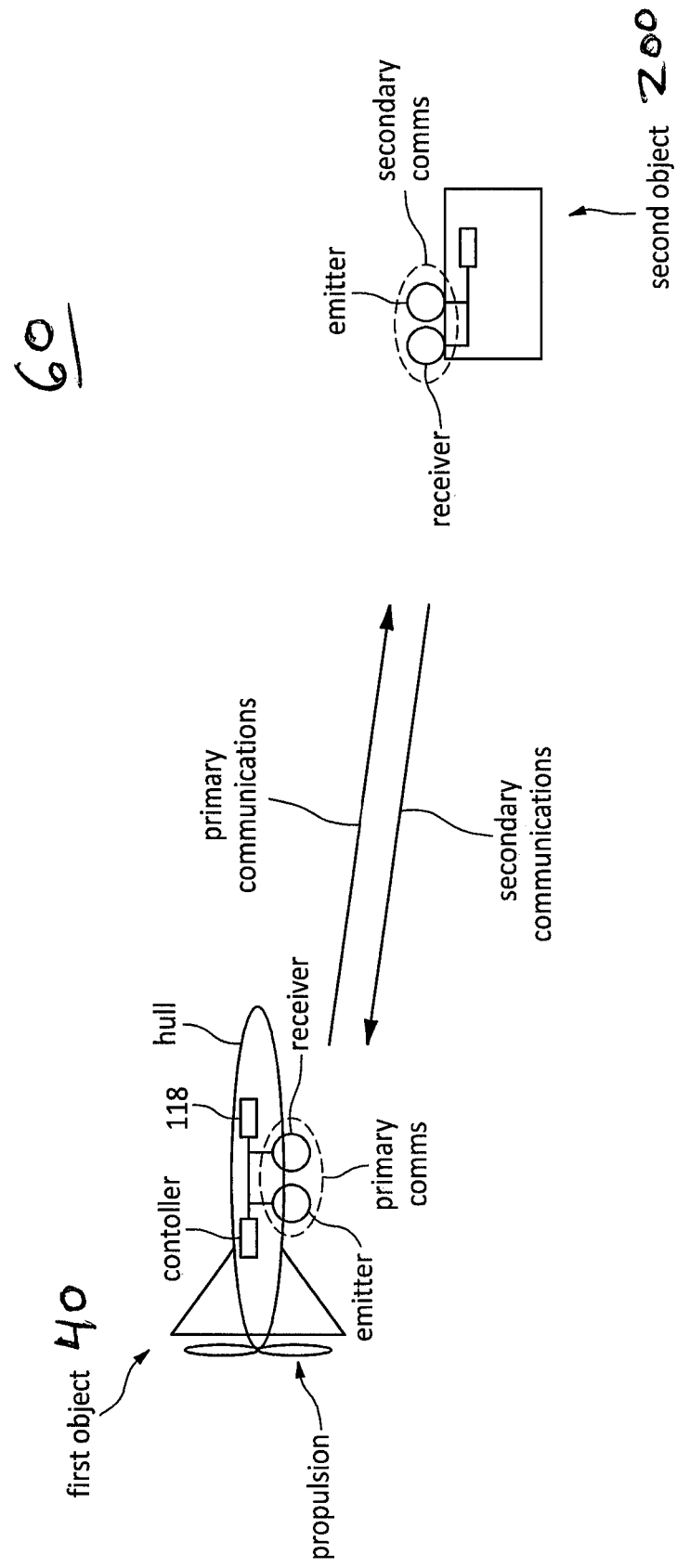
FIG. 7 illustrates the overall system of a vehicle having a primary communications device and an object having a secondary communications device, according to one embodiment.

This invention may be accomplished by providing a system 60, as illustrated in FIG. 7, with at least two objects. Most often, the first object 40 is a vehicle, and the second object 200 is remote equipment, which is mobile in some constructions and, in other constructions, is stationary. However, the first and second objects may be any suitable device or thing, as long as they comprise the requisite components described herein. Most often, one "primary" object will have a fresh (i.e., accurate due to recent calibration) clock 118 and the other "secondary" object will have an inaccurate clock, or clock that has undergone drift.

For constructions utilizing a vehicle as the primary, it has a primary communications device (i.e., a master or leader, referred herein for simplicity as the primary), and an interconnected first controller. The primary is adapted to send and receive communications through the environment and is informationally connected to the vehicle's controller. Typically, the vehicle has a propulsion mechanism, enabling it to go from an area where it may obtain an accurate time (e.g., a GPS signal) to a GPS-signal-denied area that lacks access to accurate time information, and the second object is typically in this GPS-signal-denied area. The second object has a secondary communications device (i.e., a slave, follower or minion, referred herein for simplicity as the secondary), and an interconnected controller. The secondary is also adapted to send and receive communications through the environment and is informationally connected to the second object's controller.

The vehicle's controller instructs the primary to send a first communication through the environment. The second object's secondary detects the first communication, sends the information in the first communication to the object's controller, which in turn instructs the secondary to send a second communication. The vehicle's primary detects this second communication, sends the information in the communication to the vehicle's controller, which in turn constructs a Timing Transfer Frame from the first and second communication. This Timing Transfer Frame then contains information relating to the distance between the vehicle and the second object.

In some embodiments the invention is accomplished by providing a non-transient computer readable medium containing program instruction for causing a computer to perform the steps of (a) instructing an interconnected primary to send a first communication into the environment, (b) receiving, from the primary, a second communication which came from a secondary and is sent in response to the first communication, and (c) constructing a Timing Transfer Frame from the first and second communications, where the Timing Transfer Frame has information inside of it relating to the range between the primary and the secondary.

Communications Mechanism

Figure 1B:
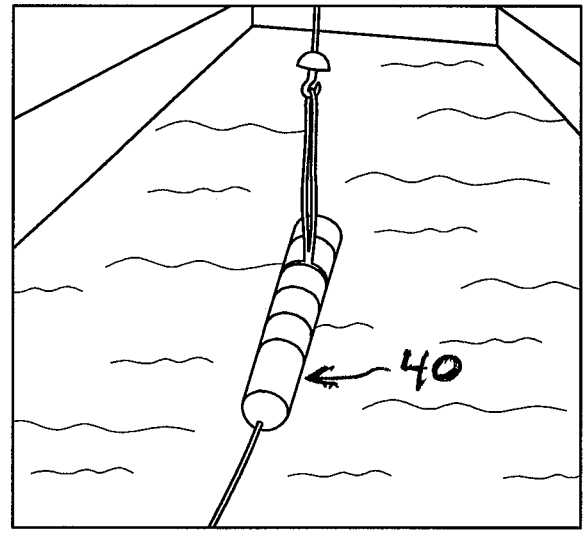
FIG. 1B is a schematic perspective view of a REMUS AUV with a 5-inch outer diameter receiver housing to serve as a vehicle utilized according to the present invention.

The present invention provides a mechanism, referred herein as the communications mechanism, to transfer information through the environment between the object and a vehicle such as AUV 40, FIG. 1B. In the currently preferred embodiment, there are two communications mechanisms; one on the vehicle, referred as the primary, and one on the object, referred as the secondary. Both primary and secondary are capable of sending and receiving transmissions (referred herein as communications) through the environment. Typically, the primary will have a more recently refreshed internal clock, but they are otherwise typically identical. In one embodiment, the communications mechanism (also referred herein as optical modems) harnesses high-power LEDs for fully bi-directional data transfer at rates of 5-20 Mbps using time-division multiplexing. The hardware is capable of communication with loose directionality requirements: when within range, the only constraint is that the relative hemisphere be known (i.e., the node must be deeper than the vehicle). Once an optical link is established, the AUV has a generous watch circle of operation, typically a radius of 10-75 meters, depending on data rate and altitude.

One distinct advantage of the presently disclosed invention's wide-angle optical communications approach is the very fast link acquisition time, which is usually hundreds of milliseconds. This fast acquisition time gives flexibly in data offload patterns, indicates a robust communication link, and facilitates multiple-node data mule missions (low overhead).

The communications mechanism hardware is shown in FIG. 1A for one construction of a primary communications device according to the present invention, including a 1000 meter-depth rated optical modem, is depicted as two halves of the communications device, with a receiver portion 20 on the left, and an emitter portion 30. In this demonstration, the modem hardware is reduced in volume by 50% by utilizing a combined processor and FPGA SoC ("System on Chip", such as an application processor and peripherals on a single die). Newly developed firmware enables several usability improvements such as remote auto-configuration and simultaneous timing information broadcast.

Communications mechanism units can be either configured as a primary, or secondary. Primary Modems determine the TDMA schedule's start time and establish a time marker as part of a Timing Transfer Frame, and the secondary modems synchronize to that marker, then demodulate and reply based on what the Timing Transfer Frame dictates. There is nothing conceptually preventing a Secondary system from forwarding accurate timing information to a Primary to correct the timing of the Primary, but for the purpose of this disclosure we will assume the reference time base (also referred to herein as "timebase") is connected to the Primary so it has the most accurate time, and the information is forwarded to the Secondary.

In the currently preferred embodiment, the underwater communications mechanism uses optical radiation to send communications (i.e., optical signals) such as described by Fan et al. in U.S. Pat. Nos. 7,953,326 and 9,231,708, for example, utilizing an optical spectrum of electromagnetic waves including wavelengths between 300 nm to 800 nm. In some other embodiments, the communications mechanism uses acoustic radiation to send communications.

Controller

Digital controlling devices, referred herein as the first and second controllers, are provided to control various aspects of the vehicle and object. The controllers may be any digital controlling system, configured to give commands and to receive information from various components of the system, as well as components outside the system such as an external control device (not shown). The controller enables real-time operational control of the system by receiving communications, storing data pertaining to communications, instructing communications sending, keeping a software-based clock, or connecting to a hardware clock, and changing parameters of any of the interconnected components. Furthermore, the controller is configured to receive commands or data from external sources.

Digital controlling devices for vehicles perform all common informational receiving, relaying and transmitting commands between electrical components within the vehicle and to the secondary object. A single board controller, for example a Raspberry Pi computer, can be utilized for, some constructions. In other constructions, the vehicle controller comprises an interconnected Arduino Uno microcontroller with a Wave Shield for audio transmission. In some embodiments, the controller comprises more than physical structure, separated by control over different components, for example the controller may further comprise a DAQ, an amplifier, a battery and a power board. See, e.g., U.S. Patent Application Pub. No. 2019/0204430 A1 by Schmidt et al.

TDMA Logical Channel

One aspect of the present invention is a logical communication channel interleaved with the usual data, referred to herein as "Out-of-Band" (OOB), "Timing Transfer Frame" or "Timing and Configuration Frame", FIG. 2. The TDMA protocol has been modified and a new frame type defined that includes a variety of low-level link information about the originating system such as modem role, TDMA configuration and timing information. This new frame is sequenced and inserted in the transmit queue after a unique sync word so the receiving system can differentiate it from payload.

Timing information exchange was a consideration from the very start of the design process. OOB frames are generated and detected in the most deterministic way possible so that time of flight can be inferred through minimal system jitter. All data to be packed into the OOB frame is latched at time Tseq, as the preamble is generated, such as shown in FIG. 2 for an OOB having data including "INDEX", "CONFIGURATION", "TDMA SETTINGS", "PPS PERIOD", "TX COUNTS" (transmitter counts), "RX COUNTS" (receiver counts), "UNIX TIME", "TIME OF FLIGHT" and "LINK HEALTH". For a given preamble length and data rate, our FPGA architecture provides absolutely no latency variation between that point and the start of frame sequencing. OOB frames are given more Forward Error Correction (FEC) words as well as more non-recursive line code.

We have observed that the correlator output of our frame detector shows acceptable jitter against the actual signal coming into the demodulator. The correlator peak detection time Tdet is thus a reliable marker for determining frame arrival. This logical channel has a minor impact on bandwidth, between 1 Kbps and 100 Kbps depending on the refresh rate set by the operator. Besides the timing transfer system, this expansion of the TDMA protocol lays the groundwork for several radical features at various stages of development such as automatic configuration and multiple access.

Range Finding

The system calculates range, represented by the environmental delay between OOB frame sequencing and detection on either side of the link, as needed for the Secondary system to reconstruct a usable PPS. The Primary and Secondary do this by exchanging timestamps measured in their own local system clocks. The Primary, connected directly to the reference time base (when available, if external, or to an onboard time base generator if the time base is internal to the Primary), runs a counter measuring the delay since the last reference PPS. At the time the Primary sequences an OOB frame, the value of the counter $Tseq_{primary}$ is latched, packed and sent. At the time the Primary receives an OOB reply from the secondary, the value of the counter $Tdet_{primary}$ is latched.

The secondary runs its own counter running at the Secondary's system clock. At the time an OOB frame is detected, the value of that counter $Tdet_{secondary}$ is reset, and when the schedule allows the Secondary to respond, the value of the counter $Tseq_{secondary}$ is latched, packed and sent. Thus, $Tseq_{secondary}$ is the measured delay in secondary clock cycles between OOB frame reception and sequencing, also referred to as Secondary "turnaround".

Figure 3:
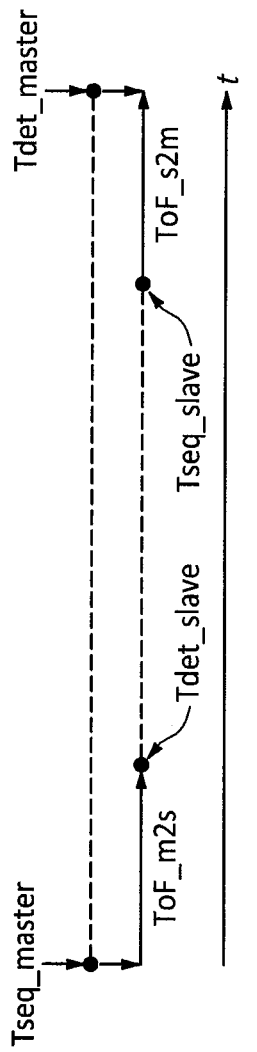
FIG. 3 illustrates the relative timing of the key times in the transmission delay estimation system.

As FIG. 3 shows, we now have all the information we need to calculate $ToF_{m2s}+ToF_{s2m}$, the time the signal spent being sent, flying, and received. We then can make the following assumptions: 1) The PCB ("Printed Circuit, Board") propagation+FPGA processing delay components are constant and similar in both $ToF_{m2s}$ and $ToF_{s2m}$, for a given communications mechanism configuration; and 2) The frequency error between the Secondary and Primary FPGA system clocks is negligible over the scale of a TDMA period (i.e. milliseconds).

We can declare $\text{ToF}_{m2s} = \text{ToF}_{s2m} = \text{ToF}$, and as shown in Math 1:

$$ToF = \frac{Tseq_{master} - Tseq_{slave} - Tseq_{master}}{2} \quad \text{Math 1}$$

This value is easily computable locally on the Primary. It is then fed though a sliding average and propagated to the Secondary. Further building on the number 1 assumption above, we can deduce that since the processing delay is constant, the only varying component of ToF is the time the signal took to propagate through the water, measured in system clock cycles. Assuming a 100 MHz frequency with a ~2.25×108 m/s, each raw ToF increment equals a 2.25 m change in range between the two communications mechanisms.

PPS Transfer and Reconstruction

As the PPS rising-edge logically occurs before its propagation to the Secondary, we have to anticipate when the next one will be. For that reason, the Secondary uses a free-running counter to reconstruct the PPS on the other side of the Optical Link. The ceiling value $PPS_{limit}$ at which this counter resets is variable, and is our main tool for synchronizing PPS across the link. As soon as a connection is established, this value is initialized to the Primary measurement of the PPS period. While not accurate, as it is measured using the Primary clock, it is a close enough that it makes convergence substantially quicker. The process remains idle until the Primary calculates a correct ToF value.

Figure 4:
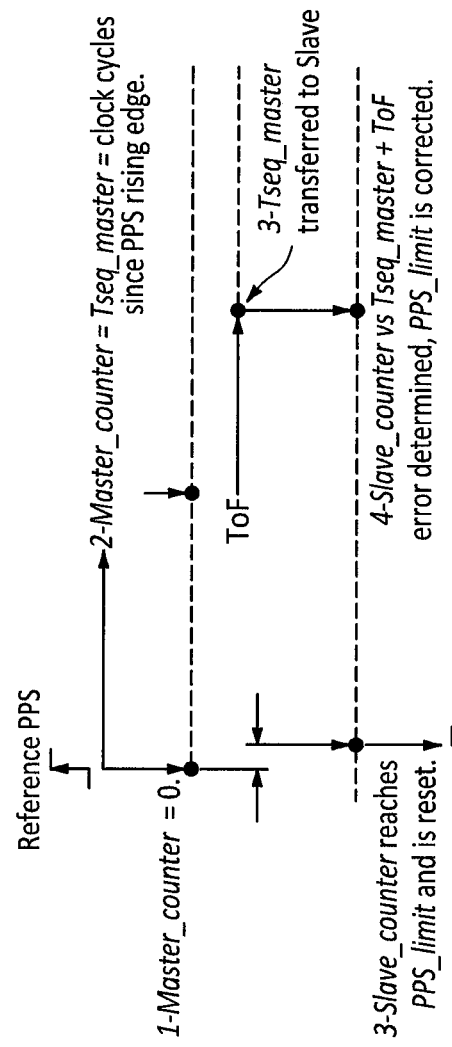
FIG. 4 illustrates the sequence and timing of the Pulse-per-Second (PPS) reconstruction system.

When valid new timing information is sent to the Secondary, the value of its PPS reconstruction timer is compared against $Tseq_{primary}$+ToF. The calculated error is then used to correct $PPS_{limit}$ (FIG. 4). If this error is above a certain threshold, $PPS_{limit}$ is decreased if the Secondary counter is fast, and vice-versa. Once the error has stabilized to a tolerable user-defined value for a number of consecutive OOB exchanges, the reconstructed PPS is determined valid and asserted outside the FPGA device.

Over the course of multiple exchanges, the frequency error between Primary and Secondary system clocks becomes too important to ignore. Thus, we chose to execute only a single correction per PPS period for this iteration of the system, right after the PPS rising edge. We've observed that the accumulated error between the Primary counter and the Secondary reconstruction counter negatively impacts the performance otherwise.

Results

Figure 5:
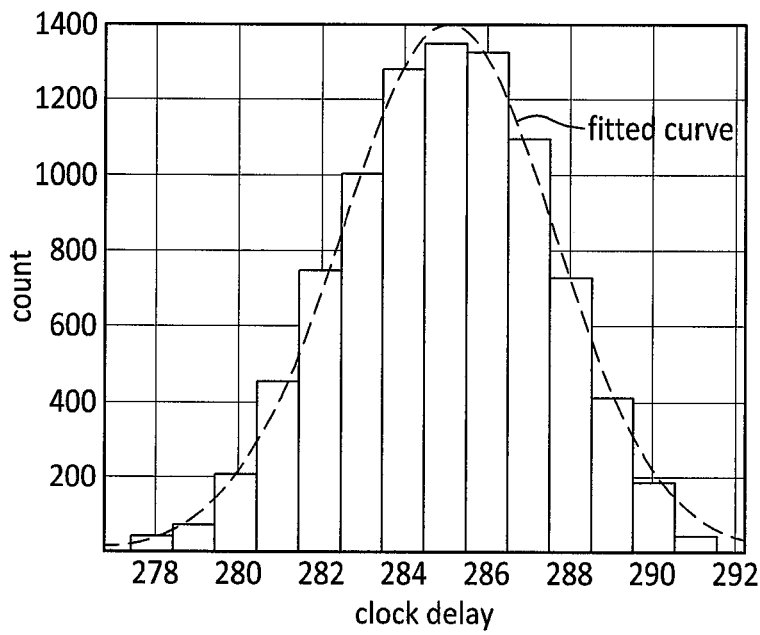
FIG. 5 is a graphical representation of 8912 consecutive unfiltered range measurements at 10 Hz show a statistical variation of 0.03 clock cycles, with R-value=0.9945.

The system was tested in the field, between an autonomous vehicle and an ocean floor platform and showed the Optical Range adequately tracking the Acoustic positioning range measurements. Unfiltered, raw data from the ToF calculator was collected at 10 Hz in the lab, and fitted with a Gaussian curve as shown in FIG. 5. It is a very good fit with an R-value of 0.9945, and leads us to believe that simple embedded post-processing, such as averaging, will dramatically improve the measurement resolution.

Figure 6:
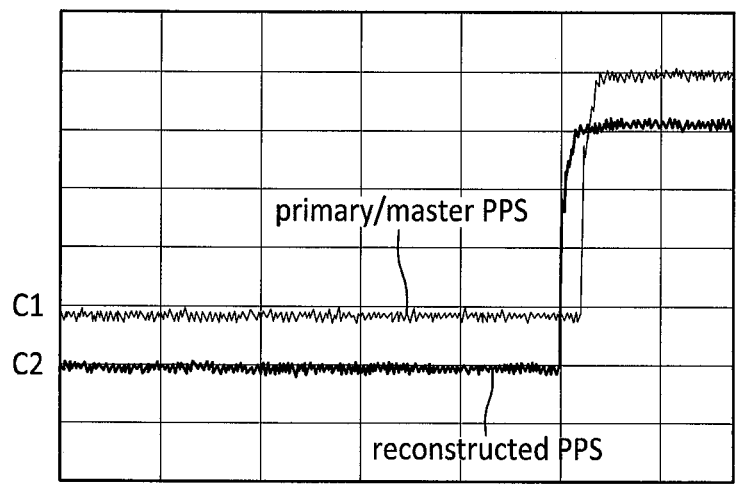
FIG. 6 shows an oscilloscope capture of the Primary PPS and the reconstructed Secondary PPS, with the reconstruction loop having its error tolerance set to 320 ns, and the instrument capturing 1572 events and calculating statistics for the delay between the two rising edges.

FIG. 6. is the result of a bench test to evaluate the quality of the PPS reconstruction. The reference PPS being fed into the Primary and the Secondary-reconstructed PPS are wired to an oscilloscope. The system is run over the course of a typical AUV loiter, 15 to 30 minutes while the oscilloscope gathers information on the delay between the two signals. We observed performance far better than the original 1 microsec jitter specification, with a measured RMS jitter of 43 ns over 1572 samples. The system was later successfully tested in the field.

Figure 8A:
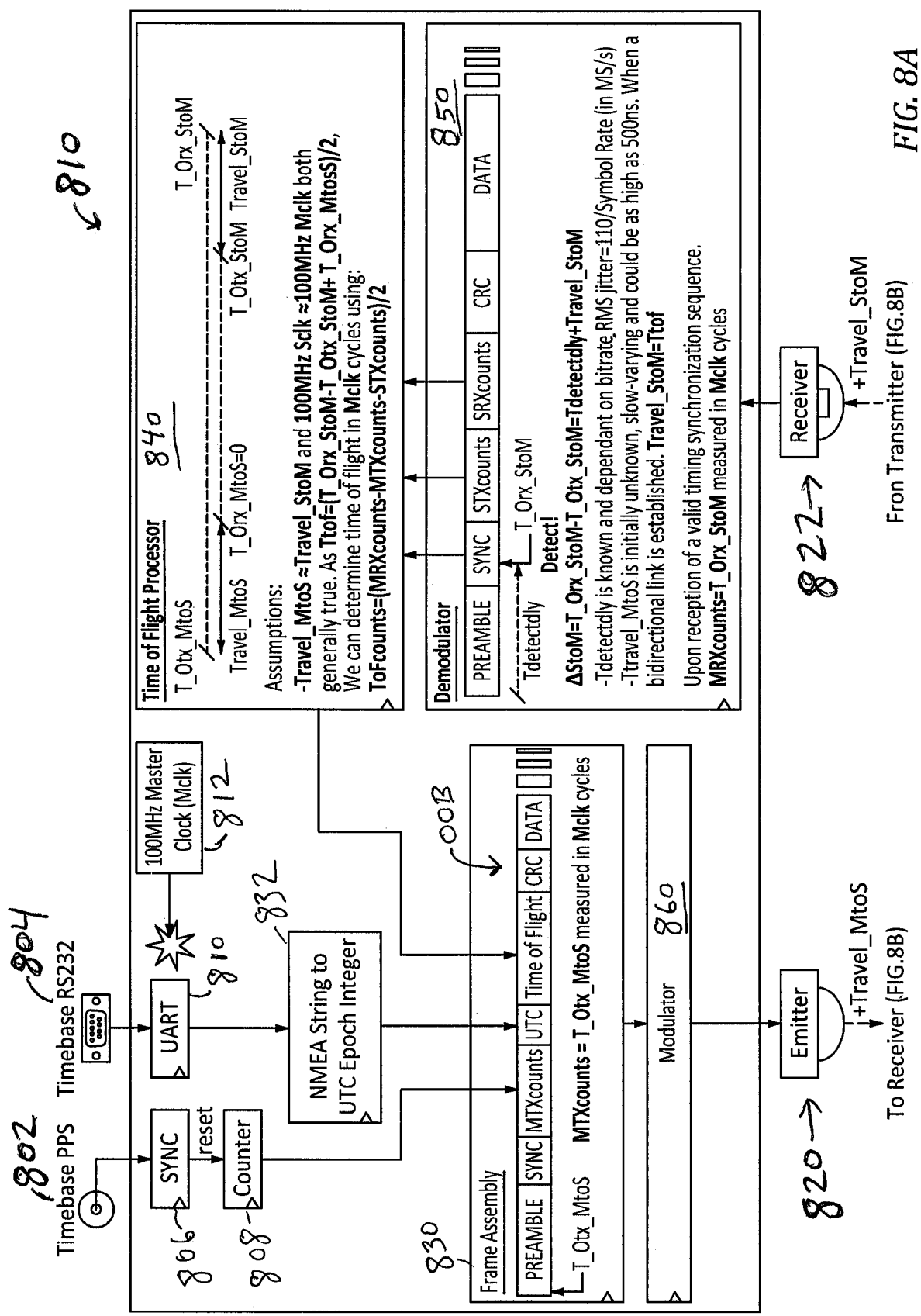
FIGS. 8A and 8B are schematic diagrams of operations performed within and between the primary vehicle and the secondary object, respectively, of FIG. 7.
Figure 8B:
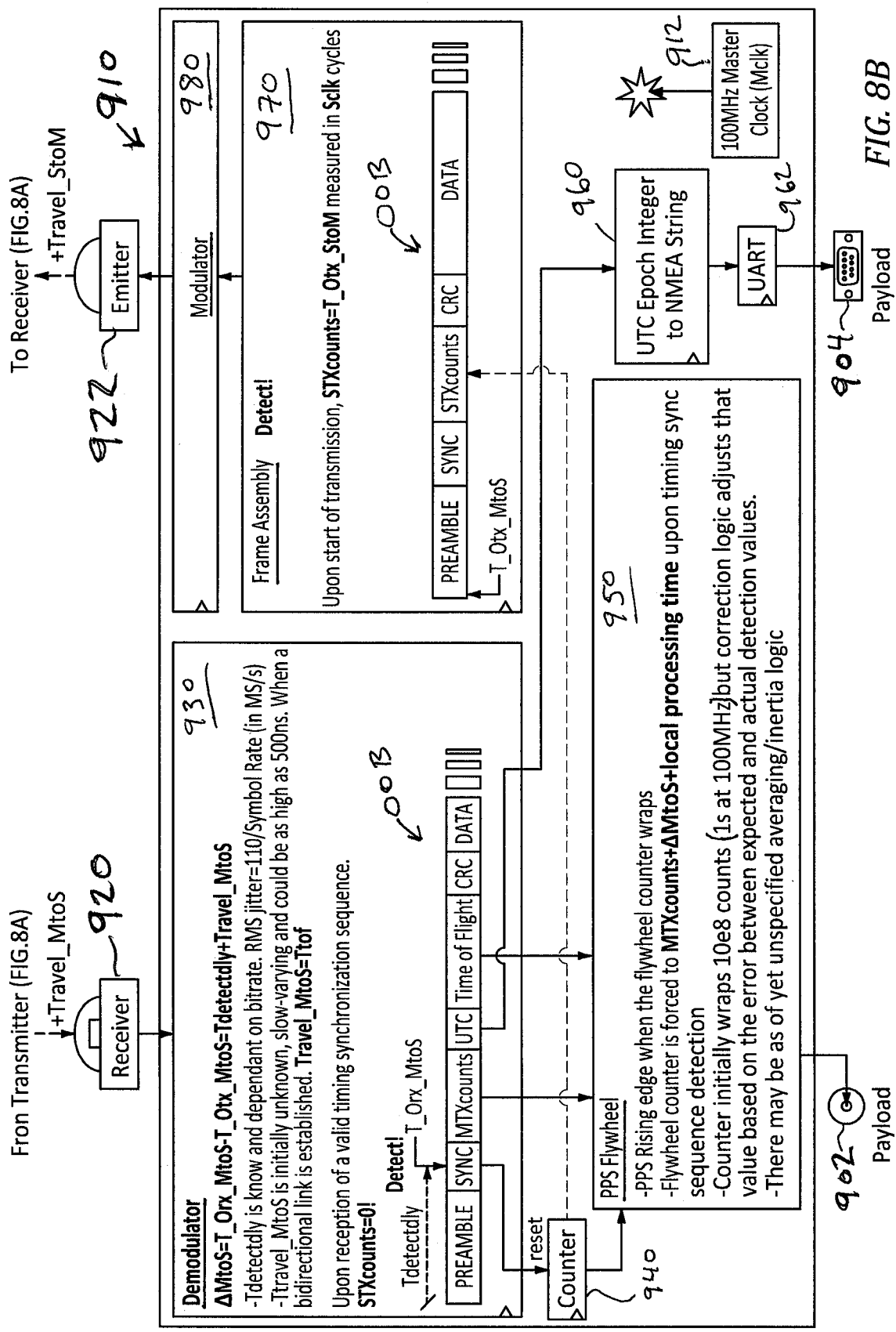

This system is depicted schematically in FIGS. 8A and 8B for operations performed within and between the primary vehicle 40 and the secondary object 200, respectively, of FIG. 7. The primary vehicle includes a computer 810, FIG. 8A, a 100 MHz Master Clock 812, and a first communications device with emitter 820 and a receiver 822. Similarly, the secondary object includes a computer 910, FIG. 8B, a Secondary 100 MHz Master Clock 912, and a second communications device with emitter 920 and a receiver 922.

In this construction, inputs to primary computer 810, FIG. 8A, include Timebase PPS signal 802 and an accurate time-of-day signal through connector 804 and UART 810 when the primary vehicle can receive external transmissions such as satellite signals (or to an onboard time base generator if the time base is internal to the Primary), which updates Master Clock 812 with the accurate time-of-day such as UTC time. UART 810 is a Universal Asynchronous Receiver-Transmitter. The PPS signal 802 is directed to SYNC 806 which resets Counter 808 to provide "MTX-counts" in the OOB created by Frame Assembly 830. Timebase function 832 sets NMEA String to UTC Epoch Integer, which provides "UTC" information in the OOB. Information for "Time of Flight" is provided by Time of Flight Processor 840 after it receives information from Demodulator 850.

After assembly within the Frame Assembly 830, FIG. 8A, the OOB is sent to Modulator 860 and then is optically transmitted by Emitter 820 and received by the Receiver 920, FIG. 8B, after "+Travel_MtoS", that is, time-of-flight travel from Primary (Master) "M" to Secondary "S". The OOB is passed to Demodulator 930 which acts on the OOB in several ways. The information "SYNC" is utilized to reset Counter 940 which updates novel PPS Flywheel module 950 along with "MTXcounts" and "Time of Flight" information. The reset value of Counter 940 is also provided to "STX-counts" in Frame Assembly 970 which provides an updated an updated OOB to Modulator 980 then Emitter 922 for optical transmission to Receiver 822, FIG. 8A, after "+Travel_StoM", that is, time-of-flight travel from Secondary "S" to Primary (Master) "M". Additionally, "UTC" information is provided from the Demodulator 930, FIG. 8B, to "UTC Epoch Integer to NMEA String" 960 then UART 962 which then updates a Payload Clock through RS232 connector 904.

Operations of novel PPS Flywheel 950 include the following. PPS Rising edge is established when the flywheel counter wraps. The Flywheel counter is forced to "MTX-counts+ΔMtoS+local processing time" upon timing sync sequence detection. The counter initially wraps 10e8 counts (1 s at 100 MHz) but correction logic adjusts that value based on the error between expected and actual detection values. Averaging and/or inertia logic can also be provided. The payload PPS is then updated via connection 902.

Conclusion

The present invention provides an added useful functionality to an already robust optical communications system. The ability to deliver accurate time to a deployed subsea instrument enables longer deployments by essentially synchronizing the system clock to the current local time.

This adds great benefit to OBS deployments and other underwater equipment deployments by extending the useful deployment duration by several years. The ability to optically measure range has far reaching implications for autonomous vehicle operations, such as rendezvous, loitering and docking applications. Early testing suggests accuracy to within the theoretical 2.25 m calculated above and with some minimal embedded post processing, this number is substantially improved.

Although specific features of the present invention are shown in some drawings and not in others, this is for convenience only, as each feature may be combined with any or all of the other features in accordance with the invention. While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

It is to be understood that the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions. Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on, or executable by, a programmable computer including any combination of any number of the following: a processor, a storage medium readable and/or writable by the processor (including, for example, volatile and non-volatile memory and/or storage elements), an input device, and an output device. The input device and/or the output device form a user interface in some embodiments. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention automatically generate and embed novel time markers in an optical modem data stream between a primary object and a secondary object, and a processor within each object records when that object receives the time markers including automatically updating data in an electronic memory representing such timing. All processing delays other than environmental delays are determined at a high processing rate to reveal time-of-flight during reconstruction of the PPS signal. Such features can only be performed by computers and other machines and cannot be performed manually or mentally by humans.

Any claims herein which affirmatively require a computer, a processor, a controller, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a controller, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays).

A computer can generally also receive (read) programs and data from, and write (store) programs and data to, a non-transitory computer-readable storage medium such as an internal disk (not shown) or a removable disk or flash memory. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium or other type of user interface. Any data disclosed herein may be implemented, for example, in one or more data structures tangibly stored on a non-transitory computer-readable medium. Embodiments of the invention may store such data in such data structure(s) and read such data from such data structure(s).

It is the intention, therefore, to be limited only as indicated by the scope of the claims appended hereto. Other embodiments will occur to those skilled in the art and are within the following claims.

What is claimed is:

1. A system for wireless time comparison and ranging, comprising:
    a vehicle including an interconnected primary communications device and a first controller;
    wherein the primary communications device is configured to transmit and receive communications;
    wherein the first controller is configured to receive information from the primary communications device;
    wherein the first controller instructs the primary communications device to transmit a first communication including (i) primary periodic timing information and (ii) time-of-day information;
    an object including an interconnected secondary communications device and second controller;
    wherein the secondary communications device is configured to receive the first communication, the second controller is configured to receive the information in the first communication from the secondary communications device, and the second controller is configured to instruct the secondary communications device to transmit a second communication including secondary periodic timing information;
    wherein the primary communications device is configured to receive the second communication and the first controller is configured to construct a Timing Transfer Frame having data based on the first and second communication;
    wherein the Timing Transfer Frame includes data relating to time-of-flight of communications between the vehicle and the object; and
    wherein the first controller determines a range between the vehicle and the object using the data in the Timing Transfer Frame.

2. The system of claim 1, wherein the primary periodic timing information includes a primary Pulse-Per-Second signal and the secondary timing information includes a secondary Pulse-Per-Second signal.

3. The system of claim 1, wherein the vehicle further includes a first clock connected to the first controller, the object further includes a second clock connected to the second controller, and the first communication includes time-of-day information from the first clock.

4. The system of claim 3, wherein the second controller calculates a corrected time using the first communication, and wherein the second clock is reset with the corrected time.

5. The system of claim 3, wherein the second communication includes time information from the second clock.

6. The system of claim 5, wherein the first controller calculates a corrected time using the second communication, and wherein the first controller instructs the primary communications device to transmit a third communication containing the corrected time.

7. The system of claim 6, wherein the secondary communications device is configured to receive the third communication, the second controller is configured to receive the information in the third communication from the secondary, and wherein the second controller calculates a second corrected time using the third communication, and wherein the second clock is reset with the second corrected time.

8. The system of claim 1 wherein the first controller (i) stores the range in a storage medium and/or (ii) transmits the range to a remote location.

9. A non-transient computer readable medium containing program instruction for causing a computer to perform a method comprising:
    (a) instructing a primary communications device to transmit a first communication including (i) primary periodic timing information and (ii) time-of-day information from a first clock;
    (b) receiving, from the primary communications device, a received second communication containing information, the second communication originating from a secondary communications device; and
    (c) constructing a Timing Transfer Frame from the first and second communication, wherein the Timing Transfer Frame includes range information relating to the time of flight of the Timing Transfer Frame between the primary communications device and the secondary communications device.

10. The non-transient computer readable medium of claim 9 further including the step of:
    (d) determining a range between the primary communications device and the secondary communications device.

11. The non-transient computer readable medium of claim 9, wherein the received second communication includes time information from a second clock interconnected with the secondary.

12. The non-transient computer readable medium of claim 11 further including the steps of:
    (e) calculating a corrected time using the second communication; and
    (f) instructing the primary to transmit a third communication including the corrected time.

13. The non-transient computer readable medium of claim 12 further including the steps of:
    (g) receiving, from the primary, a received fourth communication, the second communication originating from the secondary; and
    (h) constructing a second Timing Transfer Frame from the third and fourth communications, wherein the second Timing Transfer Frame includes second range information relating to the time of flight of the Timing Transfer Frame between the primary communications device and the secondary communications device.

14. A non-transient computer readable medium containing program instruction for causing a computer to perform a method comprising:
    (a) instructing a secondary communications device to monitor for communications;
    (b) receiving, from the secondary communications device, a received first communication originating from a primary communications device, the received first communication including (i) primary periodic timing information and (ii) time-of-day information;
    (c) instructing the secondary communications device to transmit a second communication;
    (d) receiving, from the secondary, a received third communication originating from the primary communications device;

(e) constructing a Timing Transfer Frame from the second and third communications, wherein the Timing Transfer Frame includes information relating to a range based on time-of-flight of communications between the primary communications device and the secondary communications device.

15. The non-transient computer readable medium of claim 14, further including the step of:
(f) determining a range between the primary communications device and second secondary communications device.

16. The non-transient computer readable medium of claim 14, wherein the received first communication includes time information from a first clock and the second communication includes time information from a second clock.

17. The non-transient computer readable medium of claim 16 further including the step of:
(g) calculating a corrected time using the first communication; and wherein the second communication further includes the corrected time.

18. The non-transient computer readable medium of claim 17 further including the step of:
(h) instructing the secondary communications device to transmit a fourth communication including the corrected time.

19. The non-transient computer readable medium of claim 18 further including the step of:
(i) resetting the second clock with the corrected time.

20. The non-transient computer readable medium of claim 19 further including:
sending additional communications and constructing additional Timing Transfer Frames;
determining a precise range between the primary and secondary using the additional Timing Transfer Frames; and
determining a precise corrected time using the additional Timing Transfer Frames.

\* \* \* \* \*